United States Patent [19]
Culler

[11] Patent Number: 5,042,850
[45] Date of Patent: Aug. 27, 1991

[54] SAFETY LATCH CAM AND GROOVE-TYPE QUICK DISCONNECT COUPLING

[75] Inventor: David A. Culler, Enid, Okla.

[73] Assignee: Central Machine and Tool Company, Enid, Okla.

[21] Appl. No.: 470,332

[22] Filed: Jan. 25, 1990

[51] Int. Cl.⁵ ............................................. F16L 39/00
[52] U.S. Cl. .................................. 285/320; 285/312; 285/924
[58] Field of Search ................... 285/320, 311, 312, 5, 285/924

[56] References Cited

U.S. PATENT DOCUMENTS

| | | | |
|---|---|---|---|
| 2,478,586 | 8/1949 | Krapp | 285/173 |
| 2,621,061 | 12/1952 | Beymer | 285/5 |
| 2,641,490 | 6/1953 | Krapp | 285/171 |
| 2,770,474 | 11/1956 | Krapp | 284/18 |
| 3,195,934 | 7/1965 | Parrish | 285/312 |
| 3,439,942 | 4/1969 | Moore et al. | 285/312 X |
| 4,295,670 | 10/1981 | Goodall et al. | 285/91 |
| 4,802,694 | 2/1989 | Vargo | 285/312 X |
| 4,871,195 | 10/1989 | Parrish | 285/91 |

OTHER PUBLICATIONS

Bulletin BLC-83 "Boss-Lock", Dixon Valve and Coupling Company.

Primary Examiner—Dave W. Arola
Attorney, Agent, or Firm—Laney, Dougherty, Hessin & Beavers

[57] ABSTRACT

A latch cam and groove-type quick disconnect coupling includes a tubular socket having radial openings therethrough on opposite sides thereof, and a latch cam receiving third opening extending radially therethrough at a location circumferentially equidistant from said radial openings. A tubular adapter insertable in the socket carries arcuate recesses in its outer surface at locations alignable with the three radial openings at the time of such insertion. Two coupling handles are pivotally mounted on the socket outer surface, and carry cam heads projectable through said first mentioned pair of radial openings, and into two of said arcuate recesses in the adapter. A latch cam element pivotally mounted on the outer surface of said socket adjacent the third opening through the socket includes a tip which projects through the third opening in the socket, and is selectively movable into one of the arcuate recesses in the adapter. The geometry of the latch cam element prevents separation of the adapter from the socket if the coupling handles are opened with pressure in the line in which the socket and adapter are located.

4 Claims, 3 Drawing Sheets

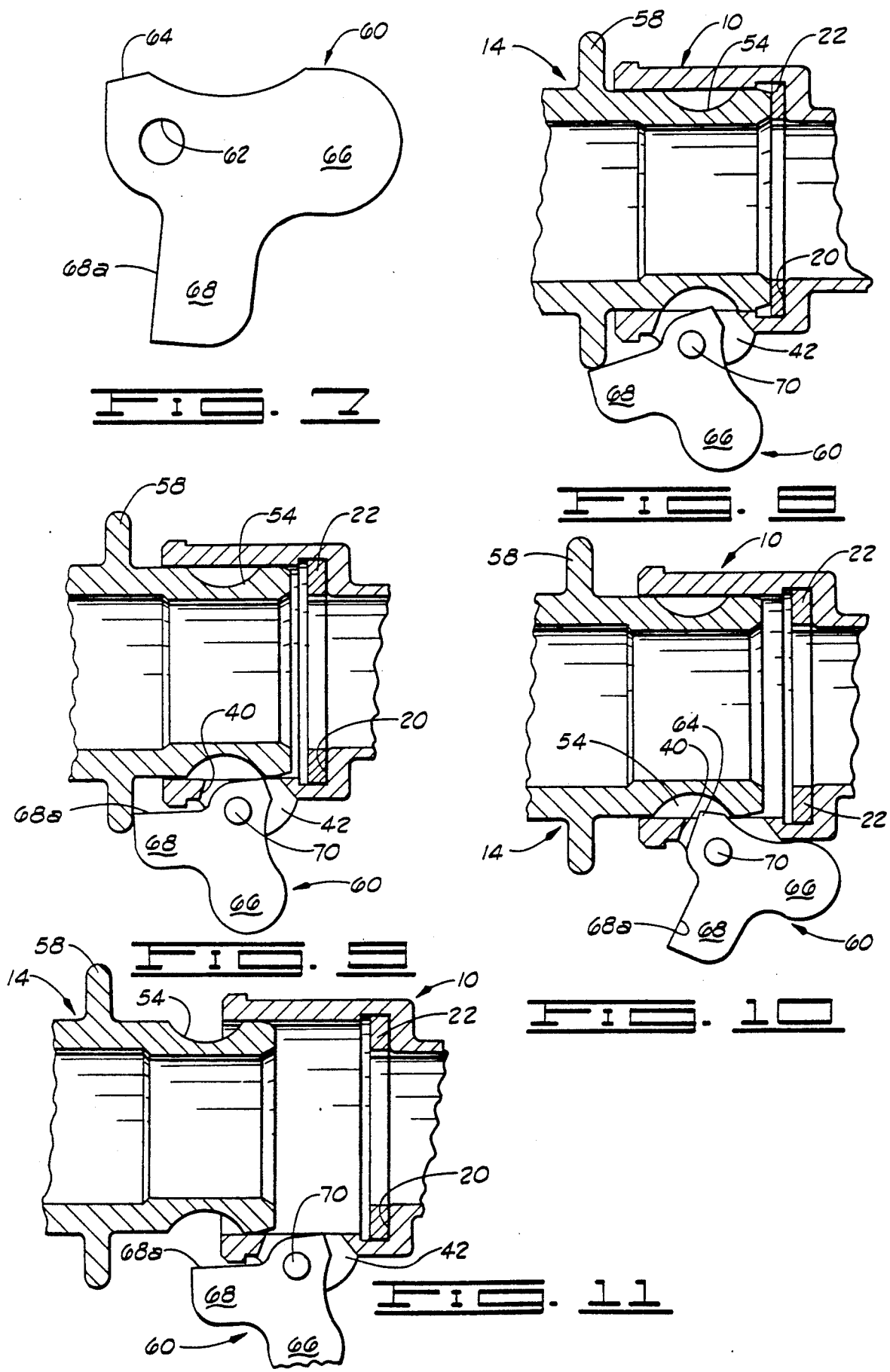

SAFETY LATCH CAM AND GROOVE-TYPE QUICK DISCONNECT COUPLING

FIELD OF THE INVENTION

This invention relates to quick disconnect couplings which use a pair of latching levers to open and close the coupling by a camming action, and more particularly, to a safety latch cam and groove-type quick disconnect coupling.

BACKGROUND OF THE INVENTION

Brief Description Of The Prior Art

Many types of quick disconnect couplings are known in the prior art. Many of these include elongated latching handles which are mounted externally on a female socket element with a cam head or cam structure on each handle which projects through an opening in the socket, and functions to engage a groove formed in a male adapter element, and bias the male adapter into interfitting, telescoped sealing relationship to the socket when the latch handles are pivoted to the latching position. The coupling can then be quickly released by pivoting the handles in the opposite direction so that the adapter can be extricated from the socket. Several patents of the type described are U.S. Pat. No. 3,195,934 to Parrish, U.S. Pat. No. 2,641,490 to Krapp and U.S. Pat. No. 2,478,586 to Krapp and U.S. Pat. No. 2,770,474.

A safety hazard often exists in the use of certain quick disconnect couplings employed for connecting the opposed ends of two lines for the purpose of conveying a fluid under high pressure from one point to another via the coupling. This hazard exists at the time that the coupling is unlatched, and the high pressure fluid is enabled to escape between the adapter and the socket, thereby creating a serious hazard to persons who may be standing adjacent the coupling at that time. Some devices have heretofore been proposed for assuring that the coupling will not decouple when the latching handles are pivoted, without some warning to persons nearby or some safety feature which will prevent total uncoupling, but rather will allow the high pressure fluid to bleed in a controlled fashion through the cracked coupling before complete disconnection occurs.

One of the types of quick disconnect couplings which includes a pin which prevents the coupling from being decoupled by pivotation of the coupling handles, and thus affords a safety feature against the release of high pressure fluid, is depicted in the "BOSS-LOCK" brochure of the Dixon Valve and Coupling Company, and is shown in U.S. Pat. No. 4,295,670.

Another type of quick disconnect coupling which includes a safety pin is that which is illustrated in U.S. Pat. No. 4,871,195 to Vargo.

Some devices have heretofore been proposed for assuring that the coupling will not decouple when the latching handles are pivoted without some warning to persons nearby, or some safety feature which will prevent total uncoupling and allow the high pressure fluid to bleed in a controlled fashion through the cracked coupling before complete disconnection occurs.

Brief Description Of The Present Invention

The present invention provides a latch cam and groove-type quick disconnect coupling which, as a result of the inclusion of a safety latch cam in the coupling assembly, cannot be totally disconnected, or even disconnected to an extent such that a rapid escape of high pressure fluid occurs so as to endanger those who may be standing near the coupling at the time that the fluid escape occurs.

Broadly described, the latch cam and groove-type quick disconnect coupling includes the conventional female socket and male adapter elements which are coupled by means of conventional latching handles carried on the socket The latching handles have cam surfaces which extend through openings in the socket and act upon an arcuate surface carried on the adapter within the socket. This causes the adapter to be biased into a sealed status within the adapter.

In the present invention, in addition to the conventional latching handles, the socket carries a safety latch cam element which is a flat cam plate mounted between a pair of specially shaped ears on the side of the socket. The flat cam plate has a point which projects through an opening in the socket into an arcuate groove carried on the male adapter. This flat plate, constituting the safety latch cam element, functions to engage the male adapter to an extent sufficient to prevent it from being completely blown out of the female socket prior to the time that a high pressure fluid passing through the coupling has bled down in a controlled fashion to a lower pressure which does not constitute a hazard to persons who may be near the coupling at the time the coupling is finally completely released.

An important object of the invention is to provide an improved safety structure for use on a quick disconnect coupling of the type which includes a pair of pivoted latching handles which function to couple and decouple the coupling as it is used.

A further object of the invention is to provide a safety latch cam element in a quick disconnect coupling, which safety latch cam element functions as a safety feature to loosely interconnect the socket and adapter of the coupling at a time when the regular latching handles are pivoted to a coupling release position.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

FIG. 7 is an elevation view of a latch cam utilized in the present invention.

FIG. 8 is a view, partially in section and partially in elevation, showing the socket and adapter interconnected, and showing the latch, cam in place due to its pivotal retention between a pair of ears carried on the outer sides of the socket.

FIG. 9 is a view similar to FIG. 8, except illustrating a different status of the male adapter and the female socket at a different time during the use of the device, and specifically, when the operating handles have been pivoted to crack the fitting and to allow high pressure fluid carried in the lines joined through the fitting to be bled down to a relatively low, safer pressure.

FIG. 10 is yet another view of the adapter section and the socket section of the coupling, and showing the latch cam in yet another position corresponding to a different status of the coupling.

FIG. 11 is yet another view of the coupling of the invention illustrating the adapter and the socket as they appear at the point of disengagement from each other after releasing the regular operating handles, and unlatching of the safety latch cam.

DETAILED DESCRIPTION OF A PREFERRED EMBODIMENT OF THE INVENTION

Figure 1:
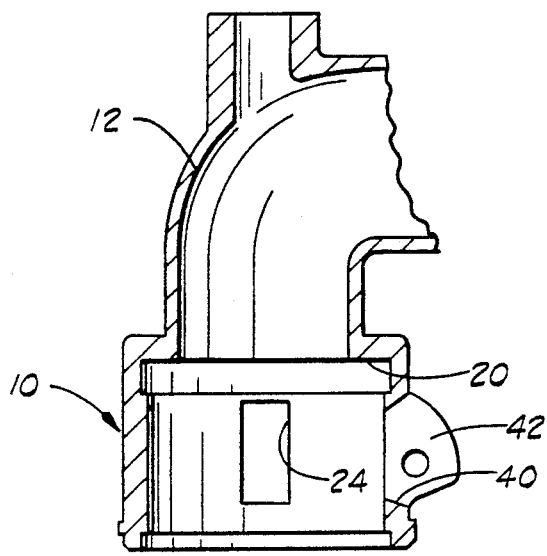
FIG. 1 is a sectional view taken through the center of a socket used in the latched cam and groove-type quick disconnect coupling of the invention.
Figure 5:
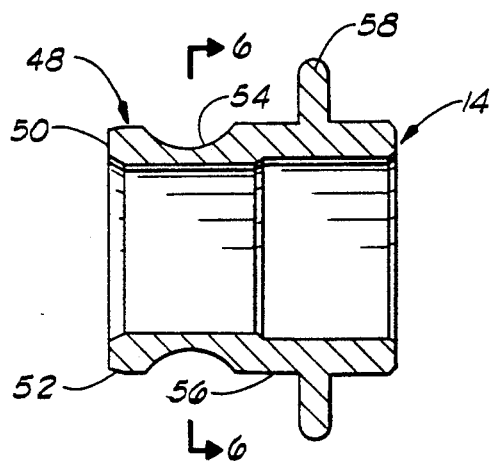
FIG. 5 is a sectional view taken along the longitudinal centerline through the center of the adapter portion of the coupling.
Figure 6:
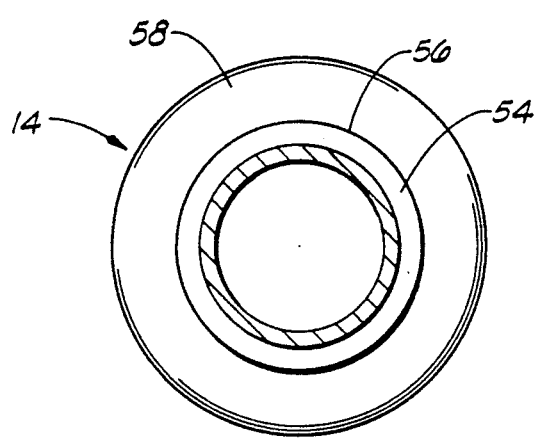
FIG. 6 is a sectional view taken along line 6—6 of FIG. 5.

Referring to FIGS. 1 and 5 of the drawings, there are here shown the two principle parts of the fitting of the invention. In one of these, a female socket illustrated in FIG. 1, and designated generally by reference numeral 10, is carried on one end of an elongated tubular pipe, tubing, line or conduit which, in the embodiment of the invention illustrated in FIG. 1, is a conduit elbow 12. In FIG. 5, the second part of the fitting is illustrated in section, and is a male adapter element 14. The male adapter element 14 is also a terminal part of a tubing, pipe, conduit or the like (not shown), and the quick disconnect coupling, made up of the socket 10 and the adapter 14, is used to quick detachably interconnect the ends of the sections of pipe or tubing which carry fluid from one location to another. Frequently, the coupling of the present invention is used to couple two lines or conduits which carry a fluid under high pressure, and it is to this type of service that the principal application of the present invention is directed.

The socket 10 is a generally cylindrical section having a larger diameter than the tubing 12 to which it is connected, and it thus defines at its point of connection to the tubing, an axially facing shoulder 20. In some embodiments of the invention, an annular, elastomeric sealing element 22 (see FIGS. 8-11) may be placed against the shoulder to enable a seal to be established between the shoulder and the end face of the male adapter 14 as hereinafter described.

Figure 4:
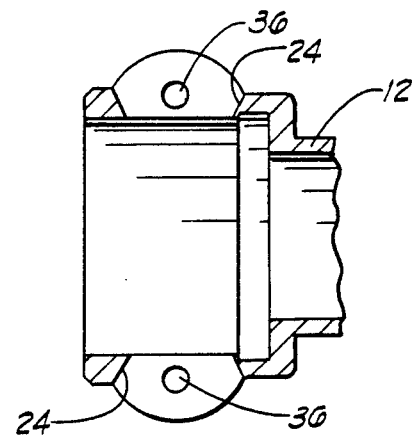
FIG. 4 is a sectional view taken along line 4—4 of FIG. 2.

Disposed on opposite sides of the socket 10 and facing each other across the socket along a diameter thereof are a pair of substantially identical openings 24. Each of the openings 24 extends radially inwardly through the wall of the socket. On the exterior of the socket, two pairs of radially protuberant ears 28, 30 and 32 and 34 are circumferentially spaced from each other around the socket. The ears in each pair are located on opposite sides of the respective openings 24. Each of the ears 28-34 is a flat plate having a semicircular or symetrically arcuate, radially outer edge, as shown in FIG. 4 of the drawings. It will also be perceived from this figure that each of the ears 28-34 is also provided with a central opening 36 which functions to accommodate a latching handle pivot pin in a manner hereinafter described.

Figure 2:
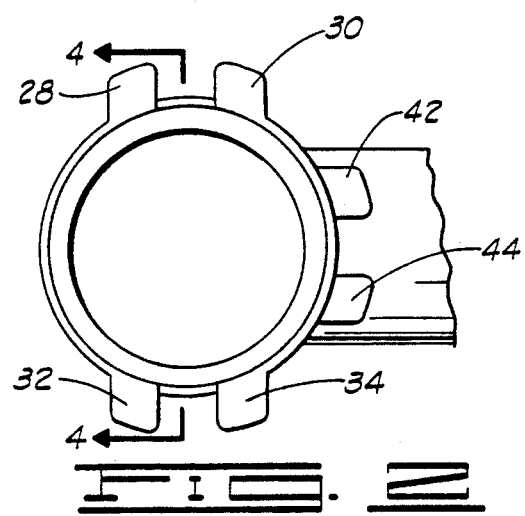
FIG. 2 is a bottom plan view of the socket shown in FIG. 1.
Figure 3:
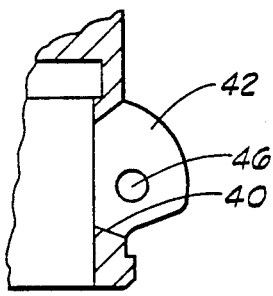
FIG. 3 is a detail view, partially in section and partially in elevation, showing one of the ears provided on the socket of the coupling adjacent a radial opening formed through the socket.

Extending through the wall of the cylindrical socket at a location which is equidistantly circumferentially spaced from the openings 24 is a latch cam opening 40. The latch cam opening 40 is, as shown in FIGS. 1, 3 and 4, substantially identical in shape to the opposed openings 24, and extends radially through the socket wall. A pair of spaced latch cam pivot plates 42 and 44 are located on opposite sides of the latch cam opening 40 and project outwardly from the outer surface of the socket 10 in the manner illustrated in FIGS. 2 and 3. Each of the latch cam pivot plates 42 and 44 has the configuration, in elevation, illustrated in FIG. 3, in which the radial outer edge thereof is arcuate along a sector of a circle for a portion of the extent of the latch cam pivot plate, and then is abruptly truncated to provide a substantially straight edge along the remaining portion of the outer edge of the latch cam pivot plate. Each of the latch cam pivot plates 42 and 44 is provided with a central aperture 46 for the accommodation of a latch cam pivot pin, as hereinafter described.

The male adapter shown in FIG. 5 includes a generally cylindrical end portion 48 which has an end face 50, a tapered lead-in surface 52, a radially indented, circumferentially extending cam groove 54 which is of semicircular cross-sectional configuration, and a cylindrical base portion 56. The base portion 56 has an outside external diameter which is selected to allow the male adapter 14 to be interfitted in the female socket 10 in the manner illustrated in FIGS. 8-10. Adjacent the base portion 56 is an annular, radially outwardly projecting stop flange 58. The stop flange 58 is positioned axially along the male adapter 14 at a location such that it will arrest the pivoting movement of the safety latch cam at a time and position during the operation of the device, as hereinafter described.

The safety latch cam element is illustrated in FIG. 7 of the drawings, and is denominated generally by reference numeral 60. The latch cam element 60 is a flat plate having a pivot pin aperture 62 formed therethrough and having a certain specific, particularly desirable, overall geometric configuration. The latch cam element thus includes a pointed inner end or tip 64, a thumb lobe 66 located on the opposite side of the cam element from the pointed inner tip, and a laterally projecting stop lug 68.

The laterally projecting stop lug 68 will be perceived to be located so that it extends outwardly from the safety latch cam element 60 at substantially a right angle to a line which is projected from the pivot pin aperture 62 to the center of the thumb lobe 66. Perhaps more importantly relative to the orientation of the laterally projecting stop lug 68 is the alignment with the pivot pin aperture 62 of a straight stop edge 68a carried on the projecting stop 68.

The safety latch cam element 60 is mounted between the paired, spaced latch cam pivot plates 42 and 44 by the use of a pivot pin 70 which is extended through the aperture 62, and through the aligned central apertures 46 formed in the spaced, opposed latch cam pivot plates 42 and 44. When the safety latch cam element 60 is mounted in this position, the pointed inner end or tip 64 swings through an arcuate path as the latch cam element is pivoted, and this movement swings the tip into and out of the arcuate cam groove 54.

It should be pointed out that in an alternate embodiment of the present invention, the radially indented, circumferentially extending cam groove 54 is replaced by three discrete, circumferentially spaced recesses provided at locations which will accomplish the same function as the annular groove by enabling certain cam head surfaces, or the pointed inner end or tip 64 of the latching cam element 60, to cooperate with these recesses to achieve the functions and objectives hereinafter discussed When the latched cam and groove-type quick disconnect coupling of the present invention is assembled in its operative position for coupling a pair of conduits to permit relatively high pressure fluid service to be delivered via the coupled conduits, the coupling made up of the adapter 14 and the socket 10 will appear as illustrated in FIG. 8. It will be noted that the end face 50 of the adapter 14 has been brought up tightly against the annular resilient sealing ring 22, and that the ring is compressed, as compared to its relaxed position as illustrated in FIGS. 10 and 11. The adpater 14, when in this position, fits snugly within the socket 10 and is biased into the sealing, fully coupled position by the latching handles 72 and 74 shown in FIGS. 12 and 13 of the drawings. The latching handles are of conventional construction, and function in the manner illustrated and fully disclosed in U.S. Pat. Nos. 4,871,195 and 3,195,934. When the latching handles are pivoted to the position shown in FIG. 12, the cam heads 76 and 78 carried on the respective latching handles 72 and 74 interact with the arcuate or semicircular cross-sectional surfaces of the annular groove 54 formed in the adapter, and, by such action, force the adapter 14 axially inwardly within the socket 10. Ultimately, this results in sealing contact with the annular sealing element 22, as shown in FIG. 8, is achieved.

During this action for the purpose of coupling the conduit or pipe sections together using the latching handles, the safety latch cam element 62 is positioned as shown in FIG. 8. The tip 64 thereof then extends into the arcuately configured annular recess 54 in the adapter 14, thus affording assurance against inadvertent uncoupling and disengagement of the socket 10 and adapter 14 from each other. This prevents a dangerous occurrence of sudden release of high pressure fluid which can cause severe injury to persons standing near the coupling when it is decoupled, particularly if the fluid is of elevated temperature. At this time and in the status shown in FIG. 8, the latching handles 72 and 74 have been pivoted downwardly to their latching positions as shown in FIG. 12, thereby biasing the adapter to its fully seated position The safety latch cam element 60 functions at this time as a safety device preventing uncoupling of the adapter and socket.

Figure 12:
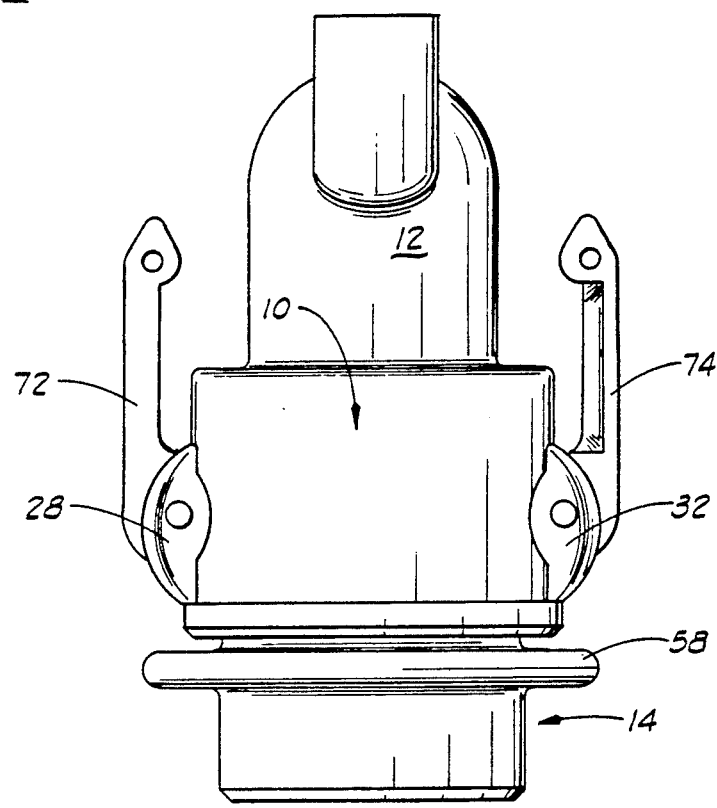
FIG. 12 is a side elevation view of the coupling showing the latching handles used thereon
Figure 13:
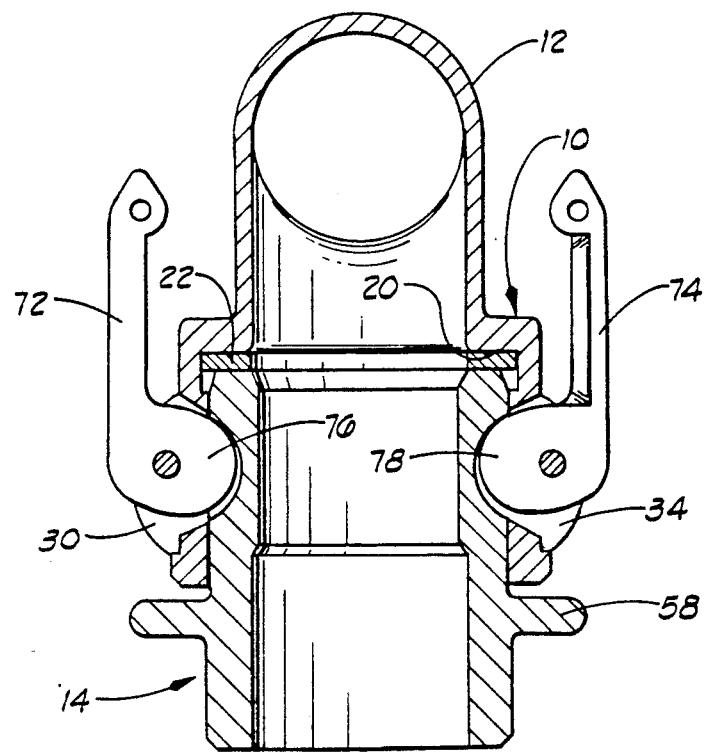
FIG. 13 is a sectional view taken along the centerline of the coupling shown in FIG. 12.

When the coupling is operatively coupled in a manner shown in FIGS. 8 and 12, it will be noted that the safety latch cam element 60 is positioned so that the laterally projecting stop lug 68 extends in a position so that its edge 68a bears against the stop flange 58. This prevents the tip 64 of the latch cam element 60 from being pivoted out of the arcuate annular groove 54 and thus affords a safety feature assuring that the coupling will not become inadvertently released or uncoupled due to the latching handles undergoing unintended pivotation. It will also be noted that the tip 64 of the safety latch cam element 60 projects into substantially the center or middle portion of the annular groove 54 at this time, and thus allows some freedom of movement of the socket relative to the adapter as the latching handles 72 and 74 are pivoted to bias the adapter and socket into their closely interfitting, sealing position.

In the status of the coupling illustrated in FIG. 9, the adapter 14 is partially inserted in the socket 10, but is not seated so as to effect the necessary seal. This status of initial engagement is such that the standard latching handles 72 and 74 are open—that is, the cam heads 76 and 78 carried thereon are out of engagement with the annular groove 54 in the adapter, and the latch cam element is unlatched—that is, the tip 64 thereof is radially outwardly from the annular groove 54. It will further be noted that the laterally projecting stop lug 68 has moved down to a position such that it contacts the stop flange 58 in a way which prevents further telescoping coupling movement of the adapter 14 relative to the socket 10.

It should be pointed out that in some installations, it is not desirable that the safety latch cam element 60 be able to fall or gravitate into the position illustrated in FIG. 9, so that is not possible to achieve final seating of the adapter 14 in the socket 10 and final coupling of tubular elements to each other. In other words, it is desirable, in some uses of the coupling, that latching of the adapter and the socket can be achieved in all orientations. In that event, the safety latch cam element 60 can be spring biased into the latching position such as that shown in FIG. 8, and will remain in this position until the thumb lobe is pivoted, or other force is applied to the latch cam element to overcome the spring bias retaining the safety latch cam element in the latching position at all orientations.

In FIG. 10 of the drawings, yet another status of the coupling and the safety latch cam element 60 is illustrated. Here the latch cam element has been pivoted over from the position shown in FIG. 8 to the position shown in FIG. 10 as a result of the separatory or parting movement of the socket 14 relative to the adapter 10. The safety latch cam element 60 is thus forced by this movement to pivot in a counterclockwise direction in moving from the position shown in FIG. 8, to the position shown in FIG. 10. This occurs because the tip 64 of the latch cam element 60 contacts the curved surface of the annular groove 54 in the adapter 14, and swings the entire latch cam element 60 counterclockwise to the position illustrated in FIG. 10. In this position, the thumb lobe 66 of the latch cam element 60 contacts the outer surface of the socket 10, and further movement of the latch cam element is arrested. In this status, however, it will be noted that the tip 64 of the latch cam element 60 still projects into the annular groove 54 formed in the adapter 10, and because it is still in this position, the socket cannot be moved further in a decoupling direction relative to the adapter 10.

The desirable result which is realized from this working of the safety latch cam element 60 and its movement to the position shown in FIG. 10 is that the coupling can then be decoupled by the conventional pivoting movement of the latching handles 72 and 74, yet the coupling between the socket 10 and the adapter 14 will not be totally released. Rather, the sealing relationship shown in FIG. 8 will be relieved sufficiently to allow high pressure fluid carried in the lines coupled through use of the coupling to be bled off through the loosely interconnected socket and adapter elements, 10 and 14, respectively. The release of the high pressure is in a controlled and gradual fashion so that persons standing near the coupling are not in endangered.

After the high pressure fluid has been bled from the coupling while it is in the status shown in FIG. 10, the safety latch cam element 60 can then be rotated in a clockwise direction to bring it to the position illustrated in FIG. 11. Here it will be noticed that the tip 64 of the latch cam element 60 has been caused to pivot out of the annular groove 54, and to release the physical interengagement of the socket 10 with the adapter 14. The socket 10 is thus free to continue its decoupling movement toward the right relative to the adapter 14, and finally, total disengagement can be achieved.

In sum, in the status illustrated in FIG. 11, the standard latching handles 72 and 74 have been pivoted to their decoupling position, and the safety latch cam element 60 has been pivoted by the use of the thumb lobe 66, and of the laterally projecting stop lobe 68 to a position where its point or tip 64 is no longer projected into the annular groove. Therefore at this time, the entire coupling can be totally disengaged. It will be appreciated, of course, that the high pressure fluid has already been released from the coupling by this time, and therefore the total disengagement occurs in a safe fashion.

Although a preferred embodiment of the invention has been herein described in order to provide guidelines adequate to permit those skilled in the art to practice the invention, and to realize the advantages which can be derived therefrom, it will further be appreciated that certain changes and innovations can be effected in the described structure and mode of operation without total departure from the inventive concepts here presented. Changes and innovations of this type are therefor deemed to be circumscribed by the spirit and scope of the invention, except as the same may be necessarily limited by the appended claims, or reasonable equivalents thereof.

What is claimed is:

1. A safety coupling comprising:
   a tubular member having a generally cylindrical female socket on one end thereof and sealing means in said socket having a wall and said socket defining a radial opening extending through the wall of the socket;
   a pair of lugs disposed on opposite sides of said radial opening and projecting outwardly from the outer surface of the wall of said female socket;
   coupling means carried on the exterior of said female socket for releasably coupling the tubular member to a male adapter;
   a tubular male adapter releasably retained by said coupling means in a joined position telescoped into said socket and into sealing engagement with said sealing means, said tubular male adapter defining a recess in the outer surface thereof at a location aligned with said radial opening through the wall of the female socket when said male adapter is telescoped into said socket;
   a radially outwardly projecting stop flange secured to the outer periphery of said male adapter and spaced axially from said recess, said radially outwardly projecting stop flange having a radially outer extremity; and
   a safety latch element pivotally mounted on said socket between said lugs for pivotation about a pivotal axis extending parallel to a plane containing the central axes of the socket and adapter, and also extending substantially tangentially with respect to the outer periphery of said generally cylindrical female socket, said safety latch element being pivotable from a safety latching first position in which a part of said safety latch element bears against the outer surface of said female socket wall, to a de-coupling second position in which said male adapter can be completely de-coupled from said female socket, said safety latch element including:
   a radially inner tip projecting from one side of said safety latch element and extending away from said pivotal axis and through said radial opening in said socket wall during the pivotal movement of said latch element from said first position toward said second position, said radially inner tip being positioned in said recess in said first position of said safety latch and pivotable into, and out of, said recess in the male adapter as said safety latch element is pivoted from said latching first position to said decoupling second position;
   said safety latch first position allowing said male adapter to move out of sealing engagement with said sealing means but preventing said male adapter from being disengaged from said female socket;
   a thumb lobe projecting from the opposite side of said latch element from the side from which said radially inner tip projects, and located on the opposite side of the pivotal axis of said latch element from said inner tip, said thumb lobe being manipulatable to pivot said radially inner tip into, and out of, said recess as said pivotable latch element is concurrently pivoted by the manipulation of said thumb lobe, said thumb lobe being that portion of said safety latch element which contacts the radially outer surface of the wall of said female socket in said safety latching first position of said latching element, and said thumb lobe being pivotable radially outwardly from said first position through about 90°, and thereby pivoting said radially inner tip across and out of said recess to then totally release said male adapter from said tubular member when said coupling means is released; and
   a laterally projecting lug extending substantially normal to a line between the latch element pivotal axis and said thumb lobe, said laterally projecting lug being pivotable into contact with the radially outer extremity of said top flange at a point in time during the time period when said thumb lob is undergoing pivotation from said first position toward said second position, and from a time when said male adapter is fully sealingly engaged with said sealing means in said female socket until a time when said male adapter is partially de-coupled from said female socket, and while said latch element has its radially inner tip in said recess, said contact with the radially outer extremity thereby preventing further pivotal movement of said latch element toward said de-coupling second position to thus prevent total decoupling of said male adapter from said tubular member until said male adapter is moved further in a de-coupling direction to allow said laterally projecting lug to clear said stop flange, and to allow said safety latch element to then be pivoted further until it reaches said de-coupling second position.

2. A safety coupling as defined in claim 1 wherein said coupling means comprises:

a second opening and third opening through the wall of said female socket and spaced circumferentially from each other around the socket;

a first latching handle pivotally connected to said socket adjacent said second opening and including a first cam head on one end of the first latching handle extendable through said second opening, and into contact with said adapter when said first latching handle is pivoted to a coupling engaging position; and a second latching handle pivotally connected to said socket adjacent said third opening and including a second cam head on one end of the second latching handle extendable through said third opening and into contact with said adapter when said second latching handle is pivoted to a coupling engaging position.

3. A safety coupling as defined in claim 1 wherein said arcuate recess in the outer surface of said male adapter is an annular groove extending around said tubular male adapter and having a concave arcuate cross-sectonal configuration.

4. A safety coupling as defined in claim 3 wherein said coupling means comprises:

a second and third opening through the wall of said female socket and spaced circumferentially from each other around the socket;

a first latching handle pivotally connected to said socket adjacent said second opening and including a first cam head on one end of the first latching handle extendable through said second opening, and into contact with said adapter when said first latching handle is pivoted to a coupling engaging position; and a second latching handle pivotally connected to said socket adjacent said third opening and including a second cam head on one end of the second latching handle extendable through said third opening and into contact with said adapter when said second latching handle is pivoted to a coupling engaging position.

* * * * *

UNITED STATES PATENT AND TRADEMARK OFFICE
CERTIFICATE OF CORRECTION

PATENT NO.   :   5,042,850
DATED        :   August 27, 1991
INVENTOR(S)  :   David A. Culler It is certified that error appears in the above-identified patent and that said Letters Patent is hereby corrected as shown below:

Column 7, line 41, after first occurrence of "socket" insert -and said socket-.

Column 7, line 45, after "projecting" insert -radially-.

Column 8, line 18, delete "decoupling" and insert -de-coupling-.

In column 8, line 47, delete "top" and insert -stop-.

In Column 8, line 48, delete "lob" and insert -lobe-.

In Column 8, line 58, delete "decoupling" and insert -de-coupling-.

Signed and Sealed this

Twenty-second Day of December, 1992

Attest:

DOUGLAS B. COMER

Attesting Officer

Acting Commissioner of Patents and Trademarks